(12) United States Patent
Gourraud

(10) Patent No.: US 7,185,087 B2
(45) Date of Patent: Feb. 27, 2007

(54) MAINTENANCE OF THIRD PARTY SERVICE'S SUBSCRIPTION INFORMATION

(75) Inventor: Christophe Gourraud, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 675 days.

(21) Appl. No.: 10/226,274

(22) Filed: Aug. 23, 2002

(65) Prior Publication Data

US 2003/0084147 A1 May 1, 2003

Related U.S. Application Data

(60) Provisional application No. 60/330,660, filed on Oct. 26, 2001.

(51) Int. Cl.
*G06F 15/173* (2006.01)
*G06F 15/177* (2006.01)
*G06F 7/00* (2006.01)
*G06F 9/44* (2006.01)

(52) U.S. Cl. .................. 709/224; 709/220; 709/223; 707/1; 707/2; 719/318

(58) Field of Classification Search ........... 709/204, 709/207, 223–226, 240, 220; 719/318; 707/1, 707/2
See application file for complete search history.

(56) References Cited

U.S. PATENT DOCUMENTS

| | | | |
|---|---|---|---|
| 5,621,892 A * | 4/1997 | Cook | ............... 709/224 |
| 6,122,510 A * | 9/2000 | Granberg | ............... 455/433 |
| 6,128,503 A * | 10/2000 | Granberg et al. | ........... 455/461 |
| 6,275,957 B1 * | 8/2001 | Novik et al. | ............... 719/318 |
| 6,460,081 B1 * | 10/2002 | Doherty et al. | ............. 709/225 |
| 6,628,951 B1 * | 9/2003 | Grohn et al. | ............... 455/445 |
| 6,636,588 B2 * | 10/2003 | Kimura et al. | ......... 379/112.04 |
| 6,771,971 B2 * | 8/2004 | Smith | ............... 455/456.1 |
| 6,829,639 B1 * | 12/2004 | Lawson et al. | ............. 709/224 |
| 6,910,070 B1 * | 6/2005 | Mishra et al. | ............. 709/224 |

OTHER PUBLICATIONS

Michel L.F. Grech et al., *Delivering Seamless Services in Open Networks Using Intelligent Service Mediation*, Bell Labs Technical Journal, Jul.-Sep. 2000, XP-000975491.

(Continued)

*Primary Examiner*—Bunjob Jaroenchonwanit
*Assistant Examiner*—Ramsey Refai
(74) *Attorney, Agent, or Firm*—Alex Nicolaescu; Ericsson Canada, Inc.

(57) ABSTRACT

The present invention relates to two methods, an apparatus and to a Service Capability Server (SCS) for controlling interactions between a network and a third party service. The SCS comprises capabilities for receiving a trigger request for at least one event from the third party service. The SCS is also capable of communicating with an apparatus in the network to add a trigger in a trigger table of the apparatus and capable of receiving a notification from the trigger table of an occurrence of the at least one event. The notification comprises the third party service reference, the reference to the at least one event and a reference to at least one user registered to the third party service within the network. The SCS is further capable of informing the third party service of the received notification of the occurrence of the at least one event.

9 Claims, 3 Drawing Sheets

OTHER PUBLICATIONS

J.C-K Lee et al., *Service Subscription Information Management in a TINA Environment Using Object-Oriented Middleware*, 2001 IEEE, XP-10538408.

M.J. Yates et al., *The Parlay Network API Specification*, BT Technol J vol. 18 No. 2, Apr. 2000, XP-958413.

Menelaos K. Perdikeas et al., *Parlay-Based Service Engineering in a Converged Internet-PSTN Environment*, Computer Networks 35, 2001, XP- 4304867.

PCT Search Report of Mar. 24, 2003, received in corresponding PCT application PCT/CA02/01595.

Sami Uskela, *Virtual Home Environment (VHE)*, S-38.128 Telecommunications Technology, special assignment (4 cr.), May 6, 1999.

*Initial Draft 3GPP TR23.955*, 3rd Generation Partnership Project, Technical Specification Group Services and Systems Aspects, Virtual Home Environment (VHE) Concepts, Release 5/4, 3GPP TSG-SA2, Los Angeles, Jan. 22-26, 2001.

* cited by examiner

MAINTENANCE OF THIRD PARTY SERVICE'S SUBSCRIPTION INFORMATION

PRIORITY STATEMENT UNDER 35 U.S.C. S.119 (e) & 37 C.F.R. S.1.78

This non-provisional patent application claims priority based upon the prior U.S. provisional patent applications entitled "Evolutions to OSA/Parlay Interfaces to Support the Virtual Home Environment (VHE) Business Model and User Profiles", application Ser. No. 60/330,660, filed Oct. 26, 2001, in the name of Christophe Gourraud.

BACKGROUND OF THE INVENTION

1. Field of the Invention

The present invention relates to maintaining service subscription information of third party services provided in a telecommunications networks.

2. Description of the Related Art

Current cellular telecommunications networks are mostly aimed at providing basic telephony services to subscribers. Additional services are provided by network owners or operators. In the coming years, new players will provide a wider range of value-added services to subscribers. In order to do so, these new players need to gain access to networks' infrastructure and capabilities. However, it must be done in a traceable way that will not compromise network security and integrity. Therefore, the development of standardized interfaces to the network has become a necessity.

For a few years now, 3GPP, in conjunction with other standardization bodies, has developed an Open Service Access (OSA) specification also referred to as Parlay/OSA. Its main objective is to provide Application Program Interfaces (APIs) for service development and deployment in telecommunications networks. On the business side, OSA is closer to third party service suppliers than network operators. In that sense, the focus of the group is on getting a wide range of network-oriented APIs. The APIs are built toward giving third party service suppliers access to the operator's network equipment functionalities.

At the present moment, user subscription information to a third party service is maintained by the third party service supplier. However, the third party services are mostly based on events occurring in the operator's network. Therefore, the third party-service supplier must ask the network operator to add triggers on corresponding events for each of its subscribed user. This registration process to third party services causes several problems. One of these problems is the number of different triggers that has to be maintained with consistency by the third party service supplier. Indeed, each modification in registration of any third party service results in modifications to a network operator's trigger database. Another problem arises because the registration of each trigger is performed by the third party service supplier into the operator's network. In fact, the network operator has no way of authenticating that the user allows the third party service supplier to receive the notification corresponding to each trigger. Yet another problem comes from the fact that the operator needs to open access to its network databases to third party service supplier. In some cases, it might be difficult to maintain consistent data in the network databases when new entries and or modifications to existing ones are made without the operator's control.

As it can be appreciated, there is a need for better service subscription information maintenance while providing third party services. The present invention provides such a solution.

SUMMARY OF THE INVENTION

The present invention is directed to an apparatus for managing registration of users of a network to a third party service. In that context, the apparatus is capable of receiving a registration request including a third party service reference from the user and generating a registration record having the third party service reference and a reference to the user from which the registration request has been received. The apparatus is also capable of receiving a trigger request from a Service Capability Server (SCS) and generating a trigger record. Both the trigger request and the trigger record comprises a reference to at least one event and the third party service reference.

The present invention is also directed to a Service Capability Server (SCS) for controlling interactions between a network and a third party service. The SCS comprises capabilities for receiving a trigger request for at least one event from the third party service. The trigger request comprises a reference to the at least one event and a third party service reference. The SCS is also capable of communicating with an apparatus in the network to add a trigger in a trigger table of the apparatus and capable of receiving a notification from the trigger table of an occurrence of the at least one event. The notification comprises the third party service reference, the reference to the at least one event and a reference to at least one user registered to the third party service within the network. The SCS is further capable of informing the third party service of the received notification of the occurrence of the at least one event.

Another aspect of the present invention is directed to a method for delivering a notification of an event to a third party service from a network, the network and the third party service interacting with each other through a Service Capability Server (SCS). The method comprises steps of detecting the event in the network, associating the event with a User_ID and s Service_ID and sending a notification to the SCS. The notification request comprises the Service_ID, the User_ID and a reference to the event. The method also comprises the step of informing the third party service of the received notification of the occurrence of the event. In the context, the User_ID is a reference to one of the users registered to the third party service and the Service_ID is a reference to the third party service.

Yet another aspect of the present invention is directed to a method for adding a trigger for an event in a network by a third party service, the network and the third party service interacting with each other through a Service Capability Server (SCS). The method comprises steps of sending a trigger request from the third party service to the SCS and informing the network of the received trigger request for the occurrence of the event. The trigger request comprises a reference to the vent and a reference to the third party service.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

The present invention relates to maintaining service subscription information of third party services provided to users in a network. At the present moment, the third party services maintain service subscription information outside the network. While it gives the third party services complete control on their registrations, it causes problems as stated previously. The invention uses a Service Capability Server (SCS) for controlling interactions between the third party services and the network. An apparatus in the network is also provided for maintaining a list of users registered to each of the third party services. The list of users may be referred to as the service subscription information. The apparatus also maintains a list of triggers on events of the network for which one of the third party services should be provided to one of the users of the network. The SCS is used by the apparatus to send event notifications to the third party services and by the third party services to send trigger request to the apparatus as explained in the following discussion.

Figure 1:
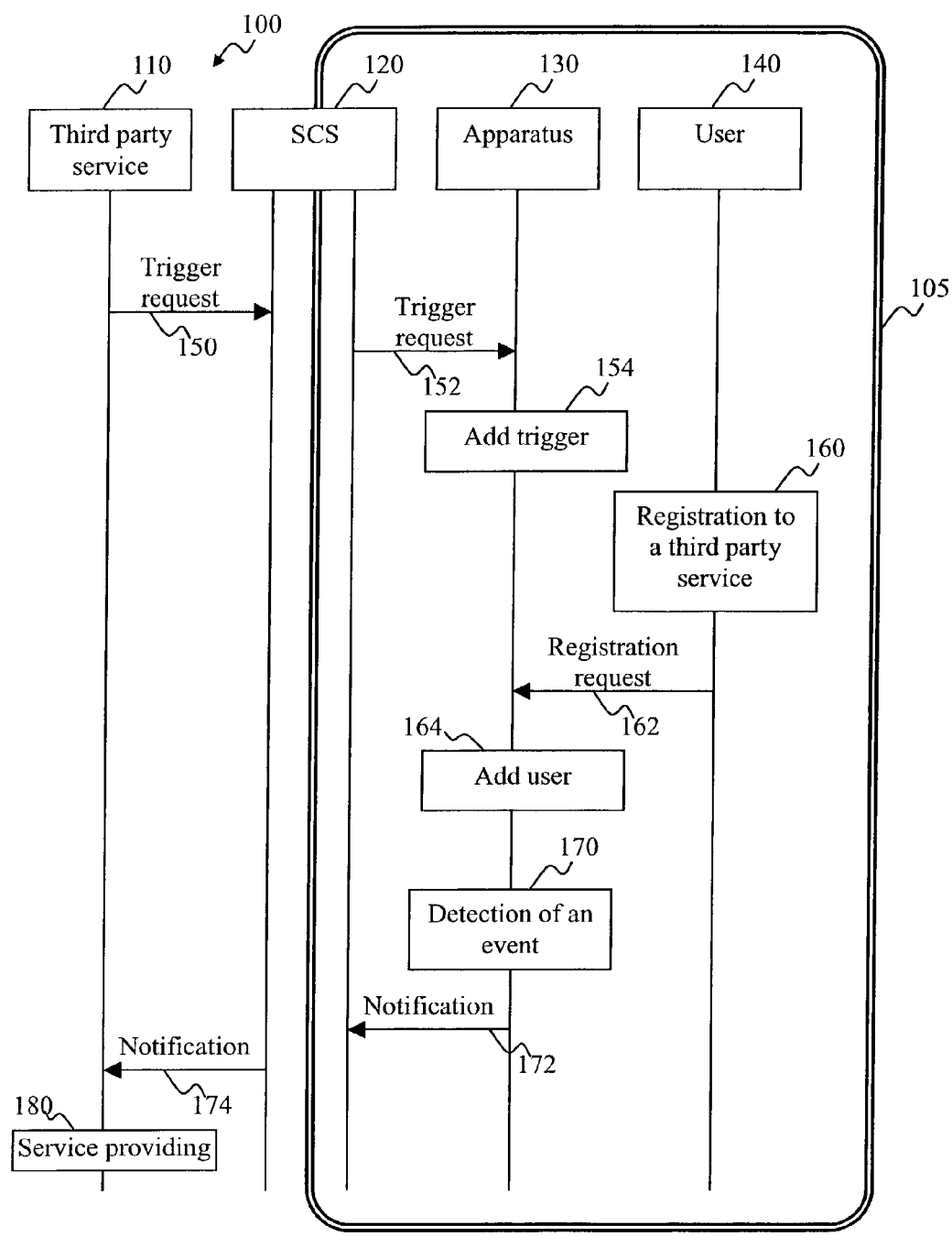
FIG. 1 is a signal flow chart showing the use of a Service Capability Server (SCS) to control interaction of a third party service and a network.

Reference is now made to the Drawings where FIG. 1 is a signal flow chart showing the use of a Service Capability Server (SCS) 120 to control interactions between a third party service 110 and a network 105. The network 105 contains at least one user 140 and an apparatus 130. As mentioned earlier, the apparatus 130 maintains a list of the users 140 registered to the third party service 110. The apparatus 130 also maintains a list of triggers on events of the network 105 for which the third party service 110 should be provided to the registered users 140. The SCS 120, in the context of the present application, refers to functionalities performed by a node of the network 105 and not specifically and only to tasks performed by a state of the art SCS as known by those skilled in the art as the SCS node.

In a first aspect of the present invention, the third party service 110 adds new triggers to the list of triggers of the apparatus 130. In order to do so, the third party service 110 sends a trigger request 150 to the SCS 120. The trigger request 150 contains a reference to the third party service and a reference to an event for which the third party service 110 needs to be notified. It should be noted that the reference to the third party service 110 can be an Internet Protocol (IP) address or any other identifier (Service_ID) understood by both the network 105 and the third party service 110. The event in the trigger request 150 is not linked to any of the users 140 since the third party service 110 is not aware of the registration of the user 140 thereto. The reference to the event can be an identifier (Event_ID) understood by both the network 105 and the third party service 110 such as a number of a text string. Furthermore, the trigger request may contain multiple references to multiple events. It is also important to note that the trigger request does not need to contain reference to users of the network 105.

Upon reception of the trigger request 150, the SCS 120 communicates with the apparatus 130 through a trigger request 152 to add a corresponding trigger to the list of triggers (step 154). In most implementations, the list of triggers is maintained in a trigger table and the list of users 140 is maintained in a registration table. Both tables are usually located in a database inside the apparatus 130. The step 154 of adding the trigger is normally performed by generating a trigger record containing the reference to the third party service 110 and the reference to the event. The trigger record is then added to the trigger table.

Another way of adding triggers into the list of triggers is to analyze an existing Service Level Agreement (SLA) between the third party service 110 and the network 105. For example, the SLA could specify that the third party service 110 is to be notified by default for a given list of events. The list of events would then be added to the list of triggers for the corresponding third party service 110.

In another aspect of the present invention, the user 140 registers to the third party service 110 (step 160) through the apparatus 130. The registration is done by sending a registration request 162 to the apparatus 130. The registration request 162 contains a reference to the third party service 110 and a reference to the user 140. The reference to the user 140 is an identifier (User_ID) provided by the network 105 to the user 140. Upon reception of the registration request 162, the apparatus 130 adds the user 140 (step 164) to the list of users. The step 164 of adding the user 140 is normally performed by generating a registration record containing the reference to the third party service 110 and the reference to the user 140 and adding the registration record to the registration table. It should be noted that the order in which the registration of the user 140 to the third party service 110 and the addition of the trigger in the apparatus 130 by the third party service 110 can be interchanged without impacting the teachings of the present invention.

When an event is detected in the network 105 (step 170), the apparatus 130 checks if one of the triggers in the list of triggers corresponds to the detected event. If so, an event notification 172 is sent toward the third party service 110 through the SCS 120. The event notification 172 contains a reference to the detected event, a reference to the third party service 110 and a reference to the user 140 registered to the third party service 110. When the SCS 120 receives the event notification, it informs the third party service 110 of the received event notification with an event notification 174. The third party service 110 can then be provided to the user 140 (step 180).

Figure 2:
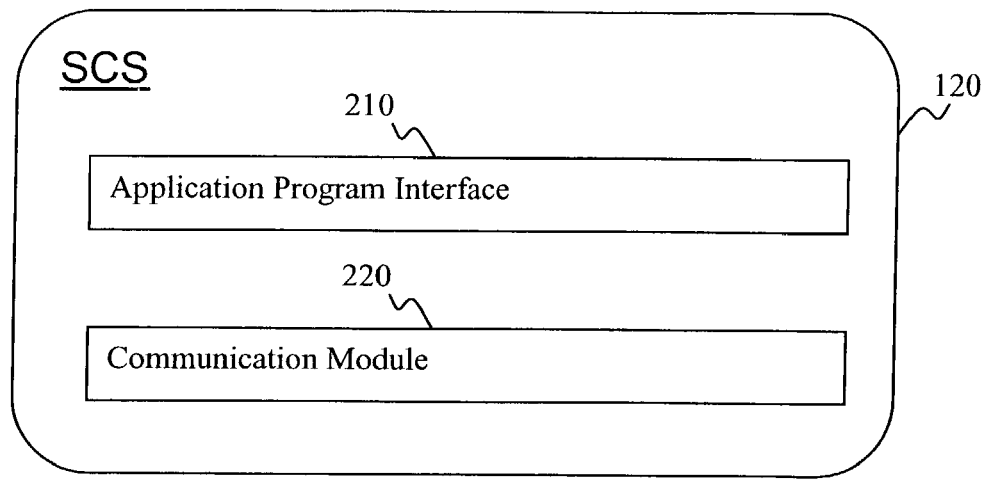
FIG. 2 is a modular representation of a Service Capability Service (SCS)

Reference is now made to FIG. 2, which depicts a modular representation of the Service Capability Server (SCS) 120. The SCS 120 comprises at least one Application Program interface (API) 210. The API 210 receives function calls in order for the SCS to treat the information received therewith. The SCS 120 also comprises a communication module 220. The communication module 220 communicates toward the third party service 110 and toward the apparatus 130.

Figure 3:
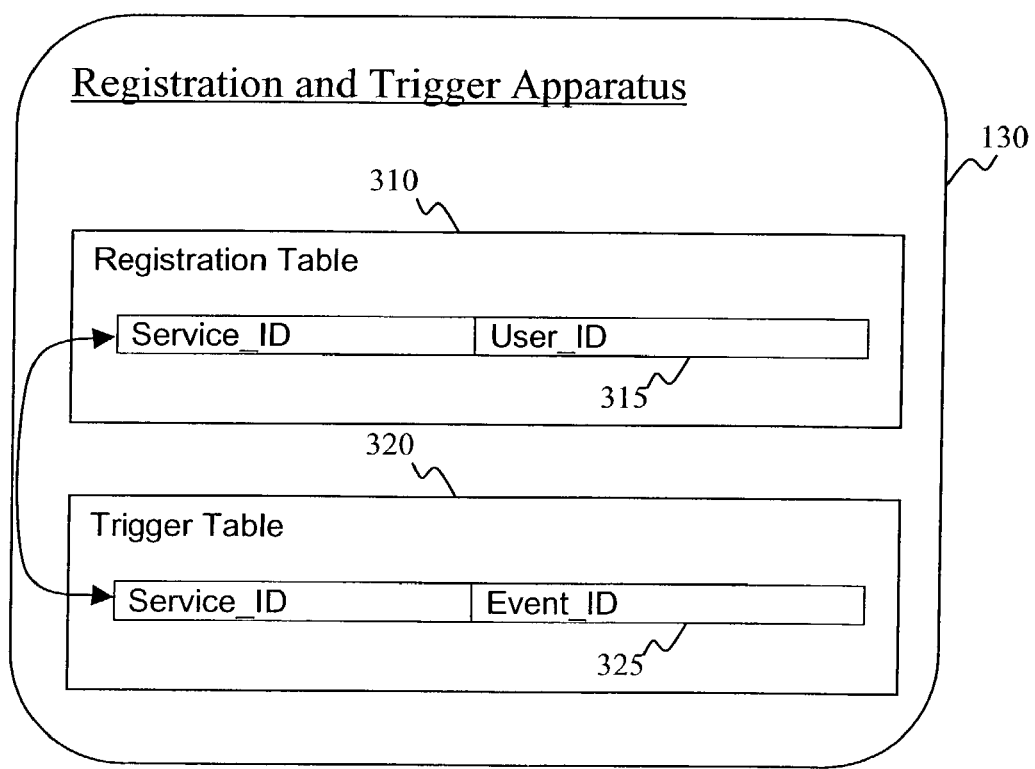
FIG. 3 is a modular representation of a registration and trigger apparatus.

Reference is now made to FIG. 3, which is a modular representation of an apparatus 130. The apparatus 130 contains a registration table 310 for maintaining the list of users 140 registered to the third party services 110. The registration table 310 contains a registration record 315 for each registration of each user 140. Each of the registration records contains the reference to the third party service 110 (Service_ID) and the reference to the user 140 (User_ID).

The apparatus also comprises a trigger table 320 for maintaining the list of triggers on event of the network 105. The trigger table contains a trigger record 325 for each event for which the third party service 110 wants to be notified. Each of the trigger records 325 contains the reference to the third party service 110 (Service_ID) and a reference to the event (Event_ID). The Service_ID is used to link at least one trigger record 325 to at least one registration record 315. Upon detection of one event in the network 105 (step 170), the apparatus 130 gathers one or more trigger record 325 corresponding to the detected event and collects one or more corresponding registration record 315. The records 315 and 325 are then used by the apparatus 130 to generate the event notification 172.

Figure 4:
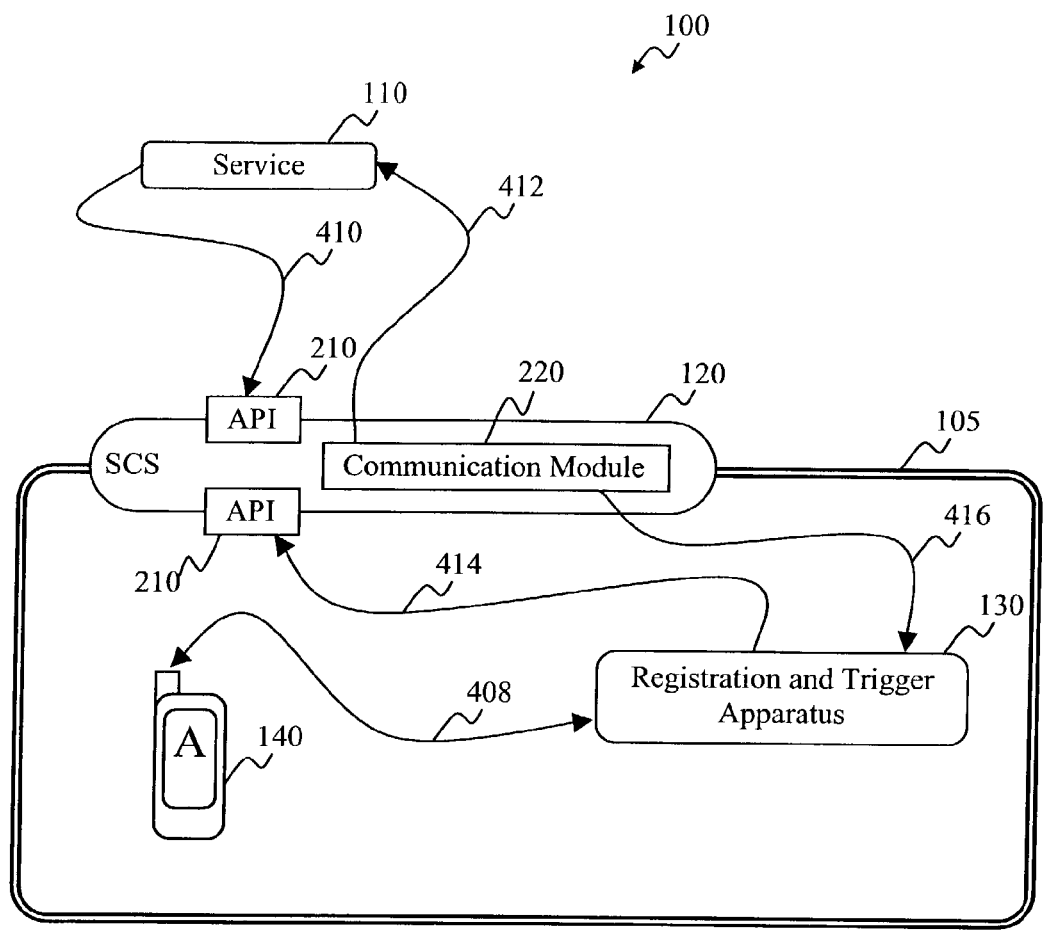
FIG. 4 is a schematic representation of a typical telecommunications network showing the use of a Service Capability Service (SCS) to control interaction of a third party service and a network in accordance with the present invention.

Reference is now made to FIG. 4, which depicts a schematic representation of a typical telecommunications network showing the use of the Service Capability Server (SCS) 120 to control interaction of the third party service 110 and the network 105. FIG. 4 shows a user-apparatus link 408 enabling transmission of the registration request 160 from the user 140 to the apparatus 130. FIG. 4 also shows how the third party service 110 communicates with the SCS 120 on a service-SCS link 410. The service-SCS link enables transmission of the trigger request 150 from the third party service 110 to the SCS 120. The API 210 usually receives the trigger request 150. The SCS, in turn, communicates toward the third party service 110 with its communication module 220 on an SCS-service link 412. The SCS-service link 412 allows the SCS 120 to inform the third party service 110 of the reception of the event notification 172 with the event notification 174. FIG. 4 also shows how the apparatus 130 communicates with the SCS 120 through an apparatus-SCS link 414 enabling transmission of the event notification 172. An SCS-apparatus link 416 is used from the SCS' 120 communication module 220 to inform the apparatus 130 of the trigger request 150 with the trigger request 152. While they can be direct connections, the links 408 to 416 are usually composed of multiple links between telecommunications equipments such as, for example, routers, bridges or Base Station Controller (BSC). For instance, the user-apparatus link 408 can be composed of an air connection toward a Base Station (BS) or antenna, a physical Ethernet link from the BS to a BSC and an optical physical link from the BSC to the apparatus 130. As for the SCS-service link, it can be composed of an optical physical link from the SCS to a router and an Ethernet link from the router to the third party service 110. Each of the links 408 to 416 can also represent co-location of two telecommunications equipments. It should be understood that the previous examples are given as such and do not limit the use of any other link composition with regard to the present invention.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. An apparatus for managing registration of users of a network to a third party service, the third party service being provided from outside the network, the apparatus performing the steps of:
    receiving a registration request from a user, registration requests includes a third party service reference which refers to a third party service that the user is registered to;
    generating a registration record for the registration request in a registration table, the registration record comprises:
        the third party service reference from the registration request; and
        a reference to the user from which the registration request has been received;
    receiving a trigger request from a Service Capability Server (SCS), the trigger request being originally sent by a third party service to the SCS
    generating a trigger record for the trigger request in a trigger table, the trigger request and the trigger record comprising:
        a reference to at least one event for which the third party service needs to be notified of; and
        a reference to the third party service from which the trigger request has been received; and
    upon detection of an event in the network:
        checking the trigger table to find a correspondence between the detected event and the trigger record;
        if a correspondence is found, sending an event notification to the SCS, the event notification comprising:
        the corresponding reference to the detected event;
        the corresponding third party service reference; and
        the corresponding reference of the user associated with the third party service; and
        forwarding the event notification from the SCS to the corresponding third party service identified in the event notification, wherein the third party service can then provide a service to the user.

2. The apparatus of claim 1 wherein the reference to the user is provided by the network.

3. The apparatus of claim 1 wherein the third party service reference is an Internet Protocol address.

4. A Service Capability Server (SCS) for controlling interactions between a network and a third party service, the third party service being provided from outside the network, the SCS performing the steps of:
    receiving a trigger request for at least one event from the third party service, the third party request comprising:
        a reference to the at least one event for which the third party service needs to be notified of; and
        a reference to the third party service from which the trigger request has been received; and
    communicating with an apparatus in the network to generate a trigger record in a trigger table of the apparatus, the trigger record, corresponding to the received trigger request, comprises:
        the reference to the at least one event for which the third party service needs to be notified of; and
        the reference to the third party service from which the trigger request has been received upon detection of an event on the network by the apparatus, and a correspondence between the detected event and the trigger table has been found by the apparatus, receiving an event notification from the apparatus, the event notification comprising:

the corresponding reference to the detected event;
the corresponding third party service reference; and
the corresponding reference of a user associated with the third party service; and forwarding the event notification to the corresponding third party service identified in the event notification, wherein the third party service can then provide a service to the user.

5. The SCS of claim 4 wherein the reference to the user is provided by the network.

6. The SCS of claim 4 wherein the third party service reference is an Internet Protocol address.

7. A method for managing third party service's registration information within a network, the third party service being provided from outside the network, the network and the third party service interacting with each other through a Service Capability Server (SCS), the method comprising steps of:

receiving a registration request from a user by an apparatus in the network, the registration request includes a third party service reference, which refers to a third party service that the user is registered to;

generating a registration record for the registration request in a registration table on the apparatus, the registration record comprising:
the third party service reference from the registration request; and
a reference to the user from which the registration request has been received;

receiving a trigger request from a Service Capability Server (SCS), the trigger request being originally sent by a third party service to the SCS;

generating a trigger record for the trigger requests, the trigger record being part of a trigger table, the trigger request and the trigger record comprising:
a reference to at least one event for which the third party service needs to be notified of; and
a reference to the third party service from which the trigger request has been received; and upon detection of an event in the network:
checking the trigger table to find a correspondence between the detected event and the trigger record;
if a correspondence is found, sending an event notification to the SCS, the event notification comprising:
the corresponding reference to the detected event;
the corresponding third party service reference; and
the corresponding reference of the user associated with the third party service; and forwarding the event notification from the SCS to the corresponding third party service identified in the event notification, wherein the third party service can then provide a service to the user.

8. The method of claim 7 wherein the step of forwarding the event notification further comprises:
analyzing an existing Service Level Agreement (SLA) between the network and the third party service; and
adding the trigger record in an apparatus of the network in accordance with the SLA.

9. The method of claim 7 wherein the reference to the third party service is an Internet Protocol address.

* * * * *